(12) United States Patent
Xu et al.

(10) Patent No.: US 12,082,305 B2
(45) Date of Patent: Sep. 3, 2024

(54) ENTITY ESTABLISHMENT PROCESSING METHOD AND APPARATUS

(71) Applicant: Huawei Technologies Co., Ltd., Shenzhen (CN)

(72) Inventors: Xiaoying Xu, Shanghai (CN); Hui Ni, Beijing (CN); Zhenzhen Cao, Beijing (CN); Qufang Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 532 days.

(21) Appl. No.: 17/401,963

(22) Filed: Aug. 13, 2021

(65) Prior Publication Data

US 2021/0385905 A1 Dec. 9, 2021

Related U.S. Application Data

(63) Continuation of application No. PCT/CN2020/075144, filed on Feb. 13, 2020.

(30) Foreign Application Priority Data

Feb. 15, 2019 (CN) .......................... 201910117738.9

(51) Int. Cl.
*H04W 80/02* (2009.01)
*H04L 1/1812* (2023.01)
*H04W 28/06* (2009.01)

(52) U.S. Cl.
CPC ........... *H04W 80/02* (2013.01); *H04L 1/1819* (2013.01); *H04W 28/06* (2013.01)

(58) Field of Classification Search
CPC ..... H04W 28/06; H04W 80/02; H04W 76/15; H04W 76/19; H04L 1/08; H04L 1/1832; H04L 1/1819; H04L 1/187
See application file for complete search history.

(56) References Cited

U.S. PATENT DOCUMENTS 10,912,031 B2 * 2/2021 Kim ...................... H04W 48/20
2003/0177437 A1 9/2003 Wu
(Continued)

FOREIGN PATENT DOCUMENTS

CN 101841853 A 9/2010
CN 106134099 A 11/2016
(Continued)

OTHER PUBLICATIONS

Guo, H. et al., "PDCP layer of the TD-LTE system; Analysis and Implementation of Confirmation Mode", with English Abstract, Communication & Information Technology, Mar. 2013, 5 pages.
(Continued)

*Primary Examiner* — Syed Ali

(74) *Attorney, Agent, or Firm* — Slater Matsil, LLP

(57) ABSTRACT

An entity establishment processing method and an apparatus are provided. The processing method includes: A terminal side device receives first indication information from a first network side device, where the first indication information is used to trigger reestablishment of a first PDCP entity of the terminal side device. When a first bearer corresponding to the first PDCP entity is not a radio bearer used to perform duplication transmission between the terminal side device and a core network side device, in a process in which the terminal side device reestablishes the first PDCP entity based on the first indication information, the terminal side device sets a parameter of the first PDCP entity to an initial value.

18 Claims, 8 Drawing Sheets

(56) References Cited

U.S. PATENT DOCUMENTS

| | | | |
|---|---|---|---|
| 2018/0083688 A1 | 3/2018 | Agiwal et al. | |
| 2019/0053310 A1 | 2/2019 | Wu | |
| 2020/0374752 A1* | 11/2020 | Xiao | H04W 76/15 |
| 2020/0383019 A1* | 12/2020 | Yao | H04W 36/023 |
| 2020/0396640 A1* | 12/2020 | Quan | H04W 28/06 |
| 2021/0144801 A1* | 5/2021 | Lu | H04W 80/02 |
| 2021/0211932 A1* | 7/2021 | Lu | H04W 28/06 |
| 2021/0267003 A1* | 8/2021 | Cho | H04W 80/02 |
| 2021/0345212 A1* | 11/2021 | Zhang | H04W 36/185 |
| 2022/0132337 A1* | 4/2022 | Muhammad | H04W 40/34 |
| 2022/0151006 A1* | 5/2022 | Muhammad | H04W 76/19 |
| 2023/0147845 A1* | 5/2023 | Teyeb | H04L 1/1887 |
| | | | 370/328 |

FOREIGN PATENT DOCUMENTS

| | | |
|---|---|---|
| CN | 107079516 A | 8/2017 |
| CN | 108347727 A | 7/2018 |
| CN | 108366369 A | 8/2018 |
| CN | 108924964 A | 11/2018 |
| EP | 2075942 A2 | 7/2009 |
| GB | 2513313 A | 10/2014 |
| WO | 2018050958 A1 | 3/2018 |
| WO | 2018085118 A1 | 5/2018 |
| WO | 2019031751 A1 | 2/2019 |

OTHER PUBLICATIONS

Huawei et al., "RLC behaviors upon duplicate deactivation", 3GPP TSG RAN WG2 #100 Meeting, R2-1712735, Reno, Nevada, US, Nov. 27-Dec. 1, 2017, 2 pages.

3GPP TS 23.501 V15.4.0 (Dec. 2018), 3rd Generation Partnership Project; Technical Specification Group Services and System Aspects; System Architecture for the 5G System; Stage 2 (Release 15), 236 pages.

Vivo, "Layer-2 behaviors of PDCP duplication activation deactivation", 3GPP TSG-RAN WG2 Meeting #99, R2-1708508, Berlin, Germany, Aug. 21-25, 2017, 3 pages.

3GPP TR 38.913 V15.0.0 (Jun. 2018), 3rd Generation Partnership Project; Technical Specification Group Radio Access Network; Study on Scenarios and Requirements for Next Generation Access Technologies (Release 15), 39 pages.

3GPP TS 38.300 V15.4.0 (Dec. 2018), 3rd Generation Partnership Project; Technical Specification Group Radio Access Network; NR; NR and NG-RAN Overall Description; Stage 2 (Release 15), 97 pages.

* cited by examiner

ENTITY ESTABLISHMENT PROCESSING METHOD AND APPARATUS

CROSS-REFERENCE TO RELATED APPLICATIONS

This application is a continuation of International Application No. PCT/CN2020/075144, filed on Feb. 13, 2020, which claims priority to Chinese Patent Application No. 201910117738.9, filed on Feb. 15, 2019. The disclosures of the aforementioned applications are hereby incorporated by reference in their entireties.

TECHNICAL FIELD

This application relates to the field of wireless communications technologies, and in particular, to an entity establishment processing method and an apparatus.

BACKGROUND

A packet data convergence protocol (PDCP) is an important protocol in a protocol stack of a long term evolution (LTE) system. A terminal side device and a network side device may perform operations such as header compression/header decompression, encryption/decryption, and integrity protection on a received data packet through a PDCP layer.

To improve transmission reliability, after receiving PDCP service data units (SDU), the terminal side device or the network side device may sequentially deliver the PDCP SDUs based on serial numbers (SN) of the PDCP SDUs. For example, the terminal side device or the network side device serves as a transmit end, and maintains a status variable TX_NEXT. The status variable is used to indicate a PDCP SN of a next PDCP SDU to be sent. When a PDCP SN of a received first PDCP SDU is inconsistent with the PDCP SN indicated by the status variable TX_NEXT, the first PDCP SDU is not processed, but after a preset duration until a second PDCP SDU including the PDCP SN indicated by the status variable TX_NEXT is received, the second PDCP SDU is preferentially delivered. Correspondingly, a receive end maintains a status variable RX_NEXT, and the status variable is used to indicate a PDCP SN of a next PDCP SDU expected to be received. It should be noted that, a PDCP SN of a PDCP SDU sent by the terminal side device to the network side device is maintained by the terminal side device. A PDCP SN of a PDCP SDU sent by the network side device to the terminal side device is maintained by the network side device.

The terminal side device triggers reestablishment of a PDCP entity of the terminal side device due to a key change or the like. When the PDCP entity is reestablished, the status variables TX_NEXT and RX_NEXT are reset to an initial value 0. After the PDCP entity is reestablished, because the status variables TX_NEXT and RX_NEXT are reset to 0, but a PDCP SN of a PDCP SDU received by the terminal side device is not 0, the terminal side device starts a reordering timer, and can deliver the received PDCP SDU to an upper layer of the PDCP layer only after the reordering timer expires, increasing an additional delay. Likewise, when a PDCP SN of a PDCP SDU received by the network side device is not 0, a reordering timer is also started, and a delay is also increased.

Therefore, how to reduce a data transmission delay when the PDCP entity is reestablished is an urgent problem to be resolved.

SUMMARY

Embodiments of this application provide an entity establishment processing method and an apparatus, to resolve a problem of how to reduce a data transmission delay when a PDCP entity is reestablished.

According to a first aspect, an embodiment of this application provides an entity establishment processing method. The method includes: A terminal side device receives first indication information from a first network side device, where the first indication information is used to trigger reestablishment of a first packet data convergence protocol PDCP entity of the terminal side device. When a first bearer corresponding to the first PDCP entity is not a radio bearer used to perform duplication transmission between the terminal side device and a core network side device, in a process in which the terminal side device reestablishes the first PDCP entity, the terminal side device sets a parameter of the first PDCP entity to an initial value, where the parameter of the first PDCP includes at least one of a first parameter, a second parameter, and a third parameter, the first parameter is used to indicate a serial number or a count value of a next PDCP service data unit SDU that the first PDCP entity expects to receive, the second parameter is used to indicate a serial number or a count value of a next PDCP SDU to be sent by the first PDCP entity, and the third parameter is used to indicate a serial number or a count value of the $1^{st}$ PDCP SDU that is not delivered by the first PDCP entity to an upper layer.

According to the foregoing method, when reestablishing the first PDCP entity, the terminal side device may not set all of the first parameter, the second parameter, and the third parameter of the first PDCP entity to initial values, but may set a part of the parameters to an initial value. When the first parameter is not set to an initial value, and a serial number of a PDCP SDU received by the terminal side device through the first PDCP entity is a value indicated by using the first parameter, the terminal side device may continue to receive a PDCP SDU from the core network device by using the first parameter before the first PDCP entity is reestablished, so that continuity of serial numbers of received PDCP SDUs can be maintained, and a case in which the terminal side device resets the first parameter, but the first network side device continues to number PDCP SDUs starting from a serial number of a PDCP SDU used before the resetting and sends the PDCP SDUs, and consequently, the terminal side device mistakenly considers that a packet loss occurs in the PDCP SDUs, and repeatedly starts a reordering timer, delaying delivery of data packets to the upper layer and increasing a transmission delay is avoided. When the second parameter is not set to an initial value, the terminal side device may continue to send a PDCP SDU by using the second parameter used before the first PDCP entity is reestablished, so that continuity of serial numbers of PDCP SDUs that are sent can be maintained, and a PDCP SDU sending delay can be reduced. When the third parameter is not set to an initial value, the terminal side device determines, as soon as possible based on the third parameter, the serial number or the count value of the $1^{st}$ PDCP SDU that is not delivered to the upper layer, thereby reducing a PDCP SDU processing delay.

In a possible design, when the first bearer corresponding to the first PDCP entity is the radio bearer used to perform duplication transmission between the terminal side device and the core network side device, in the process in which the terminal side device reestablishes the first PDCP entity, the parameter of the first PDCP entity is kept unchanged.

In a possible design, the method further includes: The terminal side device receives second indication information from the first network side device, where the second indication information is used to indicate to set the parameter of the first PDCP entity to the initial value.

In a possible design, the method further includes: The terminal side device receives third indication information from the first network side device, where the third indication information is used to indicate that the first bearer is not the radio bearer used to perform duplication transmission between the terminal side device and the core network side device.

The terminal side device may accurately determine, by using the third indication information, whether the first bearer is the radio bearer used to perform duplication transmission.

In a possible design, the first bearer is an unacknowledged mode UM bearer.

According to a second aspect, an embodiment of this application provides an entity establishment processing method, including: A terminal side device receives first information, where the first information is used to trigger establishment of a first packet data convergence protocol PDCP entity. The terminal side device establishes the first PDCP entity, and sends second information to a first network side device, where the second information is used to indicate a serial number or a count value of a next PDCP service data unit SDU to be sent by the first PDCP entity.

According to the foregoing method, the terminal side device sends the second information to the first network side device, so that the first network side device may use a serial number or a count value, indicated by using the second information, of a PDCP SDU when receiving the PDCP SDU of the terminal side device. In this way, a case in which the terminal side device sends a PDCP SDU to the first network side device based on a serial number of a PDCP SDU sent by a second PDCP entity, but the first network side device receives a PDCP SDU based on a serial number of a PDCP SDU starting from 0, and consequently, the first network side device mistakenly considers that a packet loss occurs in PDCP SDUs, and repeatedly starts a reordering timer, delaying delivery of data packets to an upper layer and increasing a transmission delay can be avoided.

In a possible design, a first bearer corresponding to the first PDCP entity is a radio bearer used to perform duplication transmission between the terminal side device and a core network side device.

In a possible design, the method further includes: The terminal side device sends third information to the first network side device, where the third information is used to indicate a serial number or a count value of a next PDCP SDU that the first PDCP entity expects to receive.

In a possible design, the method further includes: The terminal side device sends fourth information to the first network side device, where the fourth information is used to indicate the terminal side device to send the second information.

In a possible design, the terminal side device further includes a second PDCP entity, and the first bearer corresponding to the first PDCP entity and a second bearer corresponding to the second PDCP entity are a pair of bearers used to perform duplication transmission; and the method further includes: The terminal side device determines, based on a first variable of the second PDCP entity, the serial number or the count value of the next PDCP service data unit SDU to be sent by the first PDCP entity of the terminal side device, where the first variable of the second PDCP entity is used to indicate a serial number or a count value of a next PDCP SDU to be sent by the second PDCP entity.

In a possible design, the method further includes: The terminal side device determines, based on a second variable of the second PDCP entity, the serial number or the count value of the next PDCP SDU that the first PDCP entity expects to receive, where the second variable of the second PDCP entity is used to indicate a serial number or a count value of a next PDCP SDU that the second PDCP entity expects to receive.

In a possible design, the terminal side device is connected to the first network side device and a second network side device in a dual connectivity manner, and that the terminal side device receives first information includes: The terminal side device receives the first information from the first network side device; or the terminal side device receives the first information from the second network side device.

According to a third aspect, an embodiment of this application provides an entity establishment processing method, including: A first network side device sends first information, where the first information is used to trigger a terminal side device to establish a first packet data convergence protocol PDCP entity. The first network side device receives second information, where the second information is used to indicate a serial number or a count value of a next PDCP service data unit SDU to be sent by the first PDCP entity.

According to the foregoing method, the first network side device may use a serial number or a count value, indicated by using the second information, of a PDCP SDU when receiving the PDCP SDU of the terminal side device. In this way, a case in which the terminal side device sends a PDCP SDU to the first network side device based on a serial number of a PDCP SDU sent by a second PDCP entity, but the first network side device receives a PDCP SDU based on a serial number of a PDCP SDU starting from 0, and consequently, the first network side device mistakenly considers that a packet loss occurs in PDCP SDUs, and repeatedly starts a reordering timer, delaying delivery of data packets to an upper layer and increasing a transmission delay can be avoided.

In a possible design, the method further includes: The first network side device receives third information, where the third information is used to indicate a serial number or a count value of a next PDCP SDU that the first PDCP entity expects to receive.

In a possible design, the first network side device determines, based on the third information, a serial number or a count value of a next PDCP SDU to be sent by a PDCP entity corresponding to the first PDCP entity to the terminal side device.

According to a fourth aspect, this application provides an apparatus. The apparatus has a function of implementing the terminal side device in the first aspect and the second aspect. For example, the apparatus includes modules, units, or means corresponding to the steps performed by the terminal side device in the first aspect and the second aspect. The function, the units, or the means may be implemented by software, or may be implemented by hardware, or may be implemented by hardware executing corresponding software.

In a possible design, the apparatus includes a processing unit and a transceiver unit. Functions performed by the processing unit and the transceiver unit may correspond to the steps performed by the terminal side device in the first aspect and the second aspect.

In a possible design, the apparatus includes a processor, and may further include a transceiver. The transceiver is configured to receive and send a signal, and the processor executes program instructions, to complete the method performed by the terminal side device in any one of the possible designs or implementations in the first aspect and the second aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the terminal side device in the first aspect and the second aspect. The processor may execute the computer program instructions stored in the memory, to complete the method performed by the terminal side device in any one of the possible designs or implementations in the first aspect and the second aspect.

According to a fifth aspect, this application provides an apparatus. The apparatus has a function of implementing the first network side device in the third aspect. For example, the apparatus includes modules, units, or means corresponding to the steps performed by the first network side device in the third aspect. The function, the units, or the means may be implemented by software, or may be implemented by hardware, or may be implemented by hardware executing corresponding software.

In a possible design, the apparatus includes a processing unit and a transceiver unit. Functions performed by the processing unit and the transceiver unit may correspond to the steps performed by the first network side device in the third aspect.

In another possible design, the communications apparatus includes a processor, and may further include a transceiver. The transceiver is configured to receive and send a signal, and the processor executes program instructions, to complete the method performed by the network side device in any one of the possible designs or implementations in the third aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the first network side device in the third aspect. The processor may execute the computer program instructions stored in the memory, to complete the method performed by the first network side device in any one of the possible designs or implementations in the third aspect.

According to a sixth aspect, this application provides a chip. The chip may communicate with a memory, or the chip may include a memory. The chip executes program instructions stored in the memory, to implement corresponding functions of the terminal side device or the first network side device in the first aspect to the third aspect.

According to a seventh aspect, this application provides a computer storage medium. The computer storage medium stores computer-readable instructions, and when the computer-readable instructions are executed, corresponding functions of the terminal side device or the first network side device in the first aspect to the third aspect are implemented.

According to an eighth aspect, this application further provides a computer program product including a software program. When the computer program product runs on a computer, corresponding functions of the terminal side device or the first network side device in the first aspect to the third aspect are implemented.

According to a ninth aspect, this application further provides a communications system. The communications system includes the terminal side device and/or the first network side device in the first aspect to the third aspect.

BRIEF DESCRIPTION OF THE DRAWINGS

FIG. 1(*b*) is a schematic architectural diagram of a communications system applicable to a method according to an embodiment of this application;

DETAILED DESCRIPTION OF ILLUSTRATIVE EMBODIMENTS

The following describes embodiments of this application in detail with reference to the accompanying drawings of the specification.

The embodiments of this application may be applied to various mobile communications systems, for example, a new radio (NR) system, a code division multiple access (CDMA) system, a wideband code division multiple access (WCDMA) system, a long term evolution (LTE) system, an advanced long term evolution (LTE-A) system, an evolved long term evolution (eLTE) system, a future communications system, and another communications system. This is not specifically limited herein.

Figure 1A:
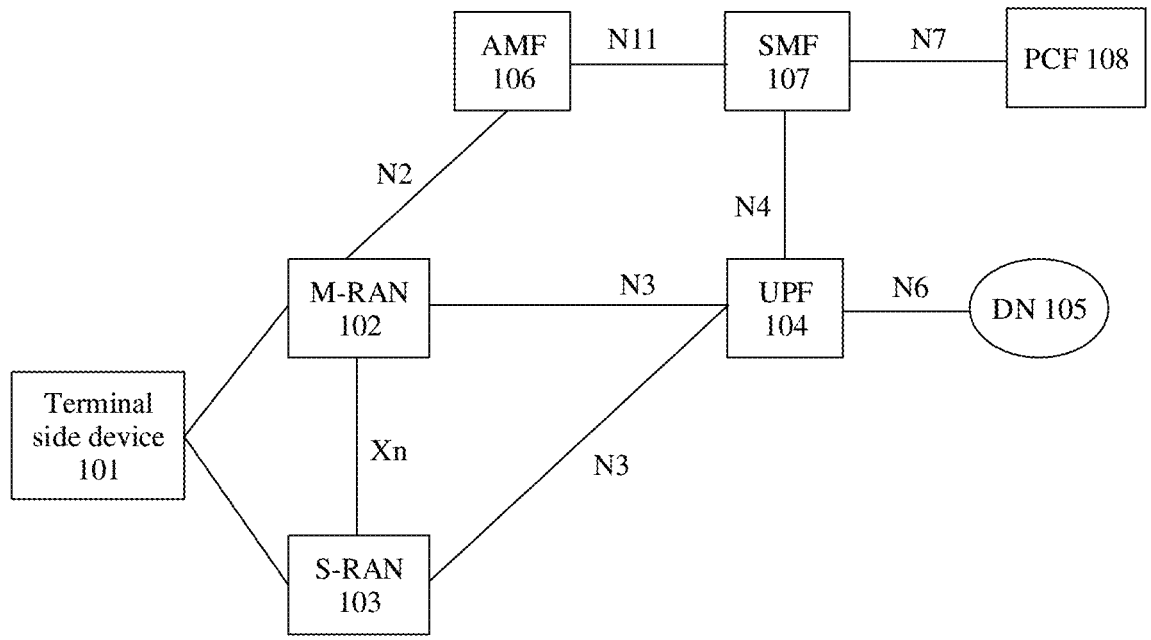
FIG. 1(*a*) is a schematic architectural diagram of a communications system applicable to a method according to an embodiment of this application.
Figure 1B:
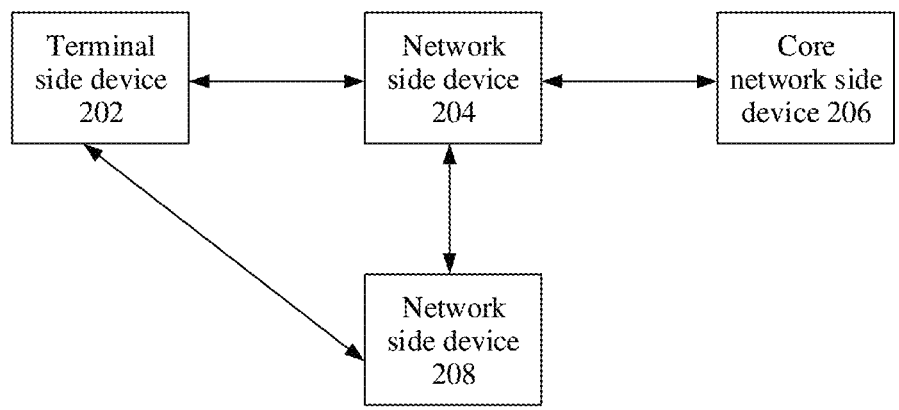

For ease of understanding the embodiments of this application, a communications system shown in FIG. 1(*a*) is first used as an example to describe in detail a communications system applicable to the embodiments of this application. FIG. 1(*a*) is a schematic architectural diagram of a communications system applicable to a method according to an embodiment of this application. As shown in FIG. 1(*a*), the communications system includes a terminal side device 101, a master network side device 102, a secondary network side device 103, a user plane function (UPF) device 104, a data network (DN) 105, an access and mobility management (AMF) device 106, a session management function (SMF)

device 107, and a policy control function (PCF) device 108. The terminal side device 101 may separately establish a connection to the master network side device 102 or the secondary network side device 103. The terminal side device 101 may alternatively be connected to the master network side device 102 and the secondary network side device 103 in a dual connectivity (DC) manner.

The master network side device 102 or the secondary network side device 103 provides a wireless access service for the terminal side device 101 and the like. The UPF device 104 is mainly responsible for performing processing such as forwarding and charging on a packet of the terminal side device 101. The packet herein includes but is not limited to a packet such as a PDCP SDU.

The DN 105 may be a network that provides a service for the terminal side device 101, for example, may provide a network access function for the terminal side device 101.

In this embodiment of this application, the terminal side device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In actual application, the terminal side device in this embodiment of this application may be a mobile phone, a tablet computer (e.g. Pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in this embodiment of this application. In this application, the device having the wireless transceiver function and the chip that can be disposed in the device are collectively referred to as the terminal side device.

In this embodiment of this application, the network side device may be a radio access network device in various standards, for example, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission and reception point (TRP), or a transmission point (TP). The network side device may alternatively be a gNB or a TRP or TP in a 5G (NR) system, one or a group of antenna panels (including a plurality of antenna panels) of a base station in a 5G system, a network node that constitutes a gNB or a transmission point, for example, a baseband unit, a DU in a central-distributed (CU-DU) architecture, or the like.

Main functions of the AMF device 106 include a termination point of a radio access network control plane, a termination point of non-access signaling, mobility management, lawful interception, access authorization or authentication, and the like. The SMF device 107 is mainly responsible for establishing a session, managing a session, and the like for the terminal side device 101. The SMF device 107 may select a proper UPF device for the terminal side device 101 based on location information of the terminal side device 101. The PCF device 108 is mainly responsible for functions such as establishment, release, and change of a user plane transmission path.

FIG. 1(*a*) further shows a possible implementation of interfaces of the devices, for example, an N2 interface between the master network side device 102 and the AMF device 106, an N3 interface between the master network side device 102 and the UPF device 104, and the like. Details are not described herein.

In a conventional technology, transmission reliability is improved by using a PDCP layer packet replication technology. To be specific, two identical PDCP layer packets may be transmitted between a terminal side device and a network side device through two independent transmission paths. The PDCP layer packet replication technology has two major application scenarios: carrier aggregation (CA) in a network side device and dual connectivity (DC).

Figure 2:
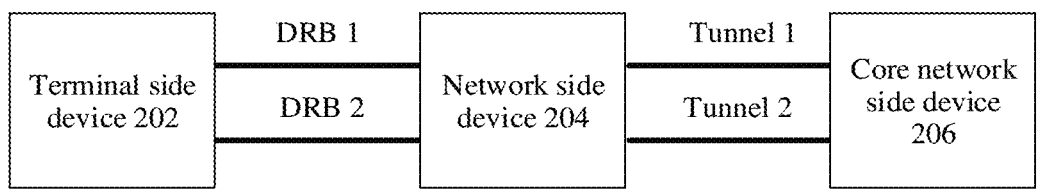
FIG. 2 is a schematic diagram of a network connection according to an embodiment of this application.

For example, with reference to FIG. 1(*a*), FIG. 1(*b*) is a schematic diagram of a simplified network architecture according to an embodiment of this application. In a CA scenario, as shown in FIG. 2, two data radio bearers (DRB) are included between a terminal side device 202 and a network side device 204: a DRB 1 and a DRB 2, where each DRB corresponds to one PDCP entity and a PDCP layer packet, that is, a PDCP SDU is transmitted through a DRB corresponding to a PDCP entity. Correspondingly, two tunnels established by using a general packet radio service (GPRS) tunnel protocol (GTP) exist between the network side device 204 and a core network side device 206: a tunnel 1 and a tunnel 2, where the tunnel 1 corresponds to the DRB 1, and the tunnel 2 corresponds to the DRB 2. In a downlink direction, the network side device 204 replicates a PDCP SDU received through the tunnel 1 or the tunnel 2, to obtain a PDCP SDU 1 and a PDCP SDU 2 that is the same as the PDCP SDU 1. The two PDCP SDUs have a same serial number. The PDCP SDU 1 is sent to the terminal side device 202 by using the DRB 1 between the network side device 204 and the terminal side device 202, and the PDCP SDU 2 is sent to the terminal side device 202 by using the DRB 2 between the network side device 204 and the terminal side device 202. When receiving the PDCP SDU 1 and the PDCP SDU 2, the terminal side device 202 may perform deduplication processing on the received PDCP SDUs based on the serial number of the PDCP SDUs. For an uplink direction, refer to the descriptions of the downlink direction. Details are not described herein again. The core network side device 206 may be a UPF device.

Figure 3:
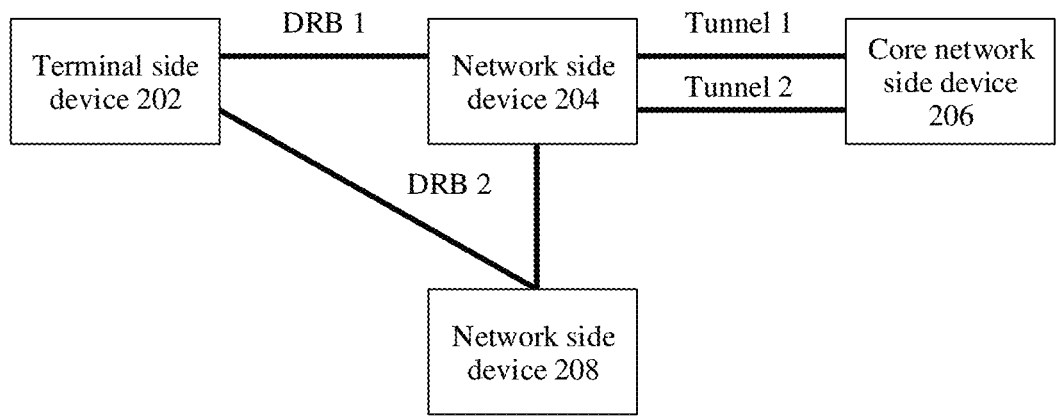
FIG. 3 is a schematic diagram of a network connection according to an embodiment of this application.

For another example, with reference to FIG. 1(*b*), in a DC scenario, as shown in FIG. 3, a terminal side device 101 establishes connections to both a network side device 204 and a network side device 208, the network side device 204 is a master access network device, and the network side device 208 is a secondary access network device. A coverage area of the master access network device is a master cell group, and a coverage area of the secondary access network device is a secondary cell group. A DRB 1 is included between the terminal side device 202 and the network side device 204. A DRB 2 is included between the terminal side device 202 and the network side device 208. It should be noted that, in the DC scenario, the DRB 1 and the DRB 2 may share one PDCP entity of the terminal side device 202, or the DRB 1 and the DRB 2 may have different PDCP entities in the terminal side device 202. In a downlink direction, the network side device 204 replicates a PDCP SDU received by using a tunnel 1 or a tunnel 2, to obtain a PDCP SDU 1 and a PDCP SDU 2. The two PDCP SDUs have a same serial number. The PDCP SDU 1 is sent to the terminal side device 202 by using the DRB 1 between the network side device 204 and the terminal side device 202. The network side device 204 sends the PDCP SDU 2 to the network side device 208, and then the PDCP SDU 2 is sent to the terminal side device 202 by using the DRB 2 between the network side device 208 and the terminal side device 202. When receiving the PDCP SDU 1 and the PDCP SDU 2, the terminal side device 202 may perform deduplication processing on the received PDCP SDUs based on the serial number of the PDCP SDUs. For an uplink direction, refer to the descriptions of the downlink direction. Details are not described herein again.

To prevent packet disorder, the terminal side device is used as an example. In the downlink direction, the terminal side device delivers received PDCP SDUs to an upper layer according to a sequence of serial numbers of PDCP SDUs. Correspondingly, in the uplink direction, the terminal side device delivers to-be-sent PDCP SDUs to a lower layer according to a sequence of serial numbers of PDCP SDUs. Based on a same reason, a radio access network device also delivers PDCP SDUs according to a sequence of serial numbers of PDCP SDUs. Details are not described herein.

To implement sequential packet delivery, the terminal side device is used as an example. The terminal side device maintains a parameter of at least one PDCP entity. For example, parameters maintained by the terminal side device include a transmitter-side variable TX_NEXT, a first receiver-side variable RX_NEXT, a second receiver-side variable RX_DELIV, and a third receiver-side variable RX_REORD. TX_NEXT is used to indicate a count value of a next PDCP SDU to be sent, and an initial value of this parameter is 0. RX_NEXT is used to indicate a count value of a next PDCP SDU expected to be received, and an initial value of this parameter is 0. RX_DELIV is used to indicate a count value of the $1^{st}$ PDCP SDU that is not delivered to the upper layer, and an initial value of this parameter is 0. The third receiver-side variable RX_REORD is used to indicate a count value of a PDCP PDU that triggers a reordering timer.

It should be noted that a count value of a PDCP SDU includes a hyper frame number (HFN) and a serial number of the PDCP SDU. The HFN is a value separately determined by the terminal side device and the radio access network device in a same manner. For example, during initialization, both a value of the serial number of the PDCP SDU and a value of the HFN are 0. Each time the terminal side device sends a PDCP SDU, the serial number of the PDCP SDU is increased by 1. When the serial number of the PDCP SDU reaches a preset maximum value, for example, 1024, the value of the serial number of the PDCP SDU is set to 0, and the value of the HFN is increased by 1. The radio access network device also determines the HFN in the same manner. By using this method, the HFN determined by the terminal side device is the same as the HFN determined by the radio access network device. Because the HFN determined by the terminal side device is the same as the HFN determined by the radio access network device, the count value of the PDCP SDU may be determined after the serial number of the PDCP SDU is determined. It may be understood that a PDCP data PDU includes a PDCP SDU, a PDCP SN, and the like. Therefore, the PDCP SN is also referred to as a PDCP SN number of a PDCP data protocol data unit (PDU).

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

A network architecture and a service scenario described in embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

In the embodiments of this application, an NR network scenario in a wireless communications network is used as an example to describe some scenarios. It should be noted that the solutions in the embodiments of this application may further be applied to another wireless communications network, and a corresponding name may also be replaced with a name of a corresponding function in the another wireless communications network.

Figure 4:
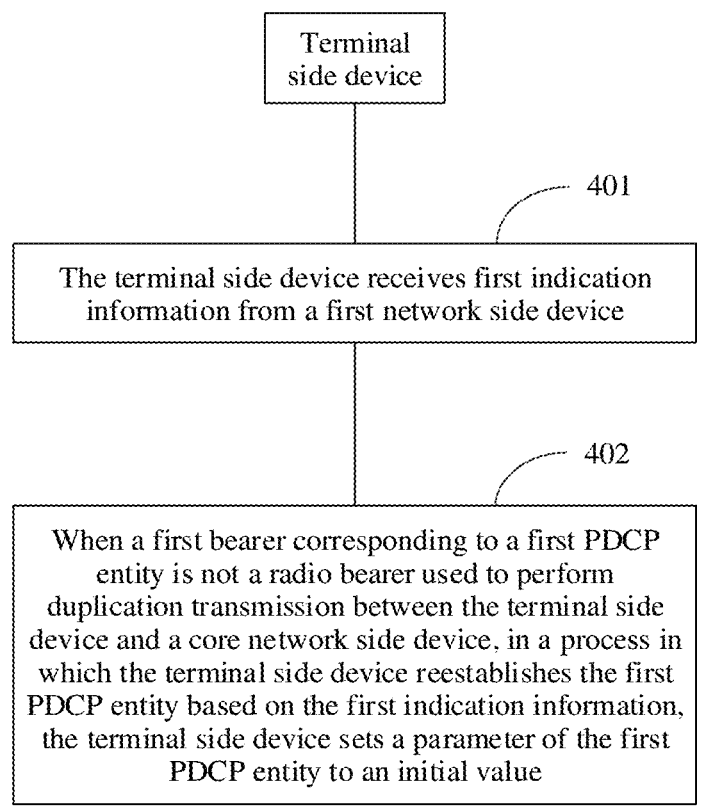
FIG. 4 is a schematic flowchart of an entity establishment processing method according to an embodiment of this application.

FIG. 4 is a schematic flowchart of an entity establishment processing method according to an embodiment of this application. The method procedure shown in FIG. 4 may be applied to the network shown in FIG. 1(*a*) or FIG. 1(*b*). In the method procedure shown in FIG. 4, a terminal side device may separately establish a connection to a first network side device, or may establish connections to the first network side device and a second network side device in a dual connectivity manner. When the terminal side device establishes the connections to the first network side device and the second network side device in the dual connectivity manner, the first network side device may be a master network side device, or may be a secondary network side device. This is not limited in this embodiment of this application. Before step 401 in FIG. 4, the terminal side device has established a first bearer to the first network side device, and the first bearer corresponds to a first PDCP entity of the terminal side device.

Refer to FIG. 4. The method includes the following steps.

Step 401: The terminal side device receives first indication information from the first network side device.

The first indication information is used to trigger reestablishment of the first PDCP entity of the terminal side device.

It should be noted that a name and an implementation of the first indication information are not limited in this embodiment of this application. The first indication information may be carried in a message sent by the first network side device, or the first indication information may be a message sent by the first network side device. For example, the first indication information may be a radio resource control (RRC) reconfiguration message or the like. Examples are not described one by one herein.

In this embodiment of this application, that the first indication information is used to trigger reestablishment of the first PDCP entity may also be understood as that the first indication information is used to determine information about establishment of the first PDCP entity, and may include a plurality of implementations. In a possible implementation, the first indication information may be used to directly indicate the terminal side device to reestablish the first PDCP entity of the terminal side device. In another possible implementation, the first indication information may not be used to directly indicate the terminal side device to reestablish the first PDCP entity, but may be used to indirectly indicate the terminal side device to reestablish the first PDCP entity. For example, in a first possible scenario, the first indication information may be used to notify the terminal side device to change a ciphering key used by the first PDCP entity. When determining, based on the first indication information, to change the ciphering key, the terminal side device determines to reestablish the first PDCP entity. In a second possible scenario, the first indication information may be used to notify the terminal side device to perform reconfiguration related to a full configuration. In this case, when determining, based on the first indication information, to perform reconfiguration related to the full configuration, the terminal side device determines to reestablish the first PDCP entity. It may be understood that the reconfiguration related to the full configuration refers to reconfiguration related to a dedicated radio parameter configuration other than a user identifier and a ciphering key. In a third possible scenario, the first indication information may be used to notify the terminal side device to add one bearer corresponding to the first PDCP entity, so that in a process in which the terminal side device is handed over from the first network side device to the second network side device, the terminal side device can use the added bearer to receive and send data through a core network side device. In this case, the terminal side device may determine, based on the first indication information, to reestablish the first PDCP entity. Optionally, the core network side device is a UPF device. It should be noted that, in a handover process, both the added bearer and an original bearer can be used to receive and send repeated data through the core network device.

Step 402: When the first bearer corresponding to the first PDCP entity is not a radio bearer used to perform duplication transmission between the terminal side device and the core network side device, in a process in which the terminal side device reestablishes the first PDCP entity based on the first indication information, the terminal side device sets a parameter of the first PDCP entity to an initial value (for example, 0).

In a first possible scenario, the terminal side device includes only one PDCP entity (the first PDCP entity) at a PDCP layer, and the terminal side device sets the parameter of the first PDCP entity to the initial value in step 402.

In a second possible scenario, the terminal side device includes at least two PDCP entities at a PDCP layer. Without loss of generality, the first PDCP entity and a second PDCP entity are used as an example. Optionally, only the first PDCP entity in the at least two PDCP entities is an entity for maintaining parameters of the PDCP entities, and the terminal side device may set the parameter of the first PDCP entity to the initial value. Optionally, the first PDCP entity and the second PDCP entity each maintain a parameter of a respective PDCP entity. In this case, both the two PDCP entities are set to initial values in a reestablishment process.

Further, in this case, the first bearer may be an unacknowledged mode (UM) bearer.

For example, in another possible case, when the first bearer corresponding to the first PDCP entity is the radio bearer used to perform duplication transmission between the terminal side device and the core network side device, in the process in which the terminal side device reestablishes the first PDCP entity based on the first indication information, the terminal side device keeps the parameter of the first PDCP entity unchanged. Further, in this case, the first bearer may be an acknowledged mode (AM) bearer or an unacknowledged mode (UM) bearer. Data transmitted on the AM bearer supports an automatic repeat request (ARQ) at a radio link layer control protocol (RLC) layer. Data transmitted on the UM bearer does not support automatic repeat request (ARQ) at the RLC layer.

The parameter of the first PDCP includes at least one of a first parameter, a second parameter, and a third parameter. The first parameter is used to indicate a serial number or a count value of a next PDCP SDU that the first PDCP entity expects to receive. The second parameter is used to indicate a serial number or a count value of a next PDCP SDU to be sent by the first PDCP entity. The third parameter is used to indicate a serial number or a count value of the $1^{st}$ PDCP SDU that is not delivered by the first PDCP entity to an upper layer.

For example, in this embodiment of this application, a count value of a PDCP SDU includes an HFN and a serial number of the PDCP SDU. The HFN is a known value for the terminal side device and the first network side device. For a manner of determining the HFN, refer to the foregoing descriptions. In an uplink direction, a serial number of a PDCP SDU sent by the terminal side device is maintained by the terminal side device. When the terminal side device newly establishes the first PDCP entity, serial numbers of PDCP SDUs sent by the terminal side device start from 0 and are increased in ascending order. For example, the terminal side device sends three PDCP SDUs, and serial numbers of the three PDCP SDUs are sequentially 0, 1, and 2. In a downlink direction, a serial number of a PDCP SDU received by the terminal side device is maintained by a network side device. For example, the network side device determines the serial number based on a serial number in a downlink data packet received by the core network device, and the network side device may directly use a serial number or a part of the serial number in a general packet radio service (GPRS) tunneling protocol-user plane (GTP-U) header field in the downlink data packet as the serial number of the PDCP SDU, or may derive the serial number of the PDCP SDU based on the serial number in the GTP-U header field.

As described above, the core network device may be the UPF device. With reference to the foregoing descriptions, when a serial number of a PDCP SDU currently received by the terminal side device is N, the serial number that is of the next PDCP SDU expected to be received and that is indicated by using the first parameter is N+1, where N is an integer greater than or equal to 0. When a serial number of a PDCP SDU currently sent by the terminal side device is M, the serial number that is of the next PDCP SDU to be sent and that is indicated by using the second parameter is M+1, where M is an integer greater than or equal to 0. When a serial number of the current $1^{st}$ PDCP SDU that is not delivered by the terminal side device to the upper layer is K, the serial number that is of the $1^{st}$ PDCP SDU that is not delivered to the upper layer and that is indicated by using the third parameter is K, where K is an integer greater than or equal to 0. Correspondingly, when the first parameter, the second parameter, and the third parameter are used to indicate count values of PDCP SDUs, refer to the foregoing descriptions. Details are not described herein again.

It should be noted that an initial value of the first parameter, an initial value of the second parameter, and an initial value of the third parameter may all be 0. The terminal side device sends uplink data to the first network side device, and the first network side device forwards, to the core network side device, the uplink data sent by the terminal side device. Correspondingly, downlink data sent by the first network side device to the terminal side device is from the core network side device, that is, the first network side device is equivalent to a forwarding device between the terminal side device and the core network side device.

As shown in FIG. 1 to FIG. 3, the terminal side device may transmit a PDCP SDU by using a PDCP layer packet replication technology. Therefore, the terminal side device establishes two radio bearers. The two radio bearers transmit a same PDCP SDU, and the two radio bearers may be referred to as radio bearers used to perform duplication transmission between the terminal side device and the core network side device. For example, the DRB 1 and the DRB 2 in FIG. 2 are radio bearers used to perform duplication transmission between the terminal side device and the core network side device. The DRB 1 and the DRB 2 in FIG. 3 are also radio bearers used to perform duplication transmission between the terminal side device and the core network side device. It may be understood that the DRB 1 and the DRB 2 may use a same RB identifier and different logical channel identifiers. Alternatively, the DRB 1 and the DRB 2 may use different RB identifiers. It should be noted that when the DRB 1 and the DRB 2 use the same RB identifier, the DRB 1 and the DRB 2 share one PDCP entity of the terminal side device. When the DRB 1 and the DRB 2 use the different RB identifiers, the DRB 1 and the DRB 2 correspond to different PDCP entities in the terminal side device. Further, the DRB 1 and the DRB 2 transmit repeated data packets, and the repeated data packets belong to a same quality of service (QoS) flow.

If the terminal side device does not use the PDCP layer packet replication technology, a PDCP SDU sent by the terminal side device to the core network device is transmitted through only one radio bearer or one of at least two logical channels. Correspondingly, a PDCP SDU sent by the core network device to the terminal side device is transmitted through only one radio bearer or one of the at least two logical channels. In this case, the radio bearer is not a radio bearer used to perform duplication transmission between the terminal side device and the core network side device.

For example, the upper layer of the PDCP entity may be a protocol layer above the PDCP layer in a protocol stack, for example, may be an application layer or a service data adaptation protocol (SDAP) layer, or may be another protocol layer above the PDCP layer.

According to the foregoing method, when reestablishing the first PDCP entity, the terminal side device may not set all of the first parameter, the second parameter, and the third parameter of the first PDCP entity to initial values, but may set a part of the parameters to initial values. When the first parameter is not set to an initial value, and a serial number of a PDCP SDU received by the terminal side device through the first PDCP entity is a value indicated by using the first parameter, the terminal side device may continue to receive a PDCP SDU from the core network device by using the first parameter before the first PDCP entity is reestablished, so that continuity of serial numbers of received PDCP SDUs can be maintained, and a case in which the terminal side device resets the first parameter, but the first network side device continues to number PDCP SDUs starting from a serial number of a PDCP SDU used before the resetting and sends the PDCP SDUs, and consequently, the terminal side device mistakenly considers that a packet loss occurs in the PDCP SDUs, and repeatedly starts a reordering timer, delaying delivery of data packets to the upper layer and increasing a transmission delay is avoided. When the second parameter is not set to an initial value, the terminal side device may continue to send a PDCP SDU by using the second parameter used before the first PDCP entity is reestablished, so that continuity of serial numbers of PDCP SDUs that are sent can be maintained, and a PDCP SDU sending delay can be reduced. When the third parameter is not set to an initial value, the terminal side device determines, as soon as possible based on the third parameter, the serial number or the count value of the $1^{st}$ PDCP SDU that is not delivered to the upper layer, thereby reducing a PDCP SDU processing delay.

For example, in a possible implementation, the terminal side device may further receive second indication information from the first network side device, and the second indication information is used to indicate to set the parameter of the first PDCP entity to the initial value. When receiving the second indication information, the terminal side device may reestablish the first PDCP entity based on the first indication information, and set the parameter of the first PDCP entity to the initial value based on the second indication information in the process of reestablishing the first PDCP entity. In this case, the first bearer corresponding to the first PDCP entity may be the radio bearer used to perform duplication transmission between the terminal side device and the core network side device, or may not be the radio bearer used to perform duplication transmission between the terminal side device and the core network side device. The second indication information may be further used to indicate a bearer identifier or a logical channel identifier corresponding to the first bearer, and the second indication information is used to indicate to set the parameter of the first PDCP entity corresponding to the bearer identifier or the logical channel identifier to the initial value.

It should be noted that the second indication information may be carried in a message sent by the first network side device, or may be an independent message. The first indication information and the second indication information may be sent through a same message, or may be sent through different messages in sequence. This is not limited in this embodiment of this application.

It may be understood that the terminal side device may determine, based on whether the second indication information exists, whether to set the parameter of the first PDCP entity to the initial value. For example, when the terminal side device does not receive the second indication information, the terminal side device sets the parameter of the first PDCP entity to the initial value. When receiving the second indication information, the terminal side device does not set the parameter of the first PDCP entity to the initial value. The terminal side device may determine, based on a value indicated by using the second indication information, whether to set the parameter of the first PDCP entity to the initial value. For example, the value indicated by using the second indication information is true, and the parameter of the first PDCP entity is not set to the initial value. The value indicated by using the second indication information is false, and the parameter of the first PDCP entity is set to the initial value.

In this embodiment of this application, the terminal side device may determine, in a plurality of manners, whether the first bearer is the radio bearer used to perform duplication transmission between the terminal side device and the core network side device. For example, in a possible implementation, the terminal side device may further receive third indication information from the first network side device, and the third indication information is used to indicate that the first bearer is not the radio bearer used to perform duplication transmission between the terminal side device and the core network side device. In this implementation, the terminal side device may determine, based on the third indication information, whether the first bearer is the radio bearer used to perform duplication transmission.

For example, in another possible implementation, the terminal side device and the first network side device may agree in advance that when the first network side device does not send fourth indication information or the terminal side device does not receive the fourth indication information, it indicates that the first bearer is not the radio bearer used to perform duplication transmission between the terminal side device and the UPF device. The fourth indication information is used to indicate that the first bearer is the radio bearer used to perform duplication transmission between the terminal side device and the UPF device.

Figure 5:
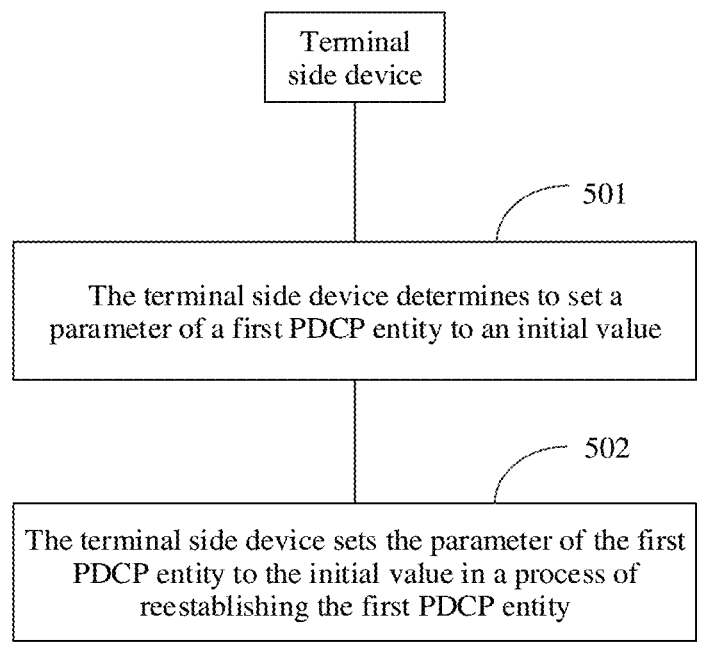
FIG. 5 is a schematic flowchart of an entity establishment processing method according to an embodiment of this application.

FIG. 5 is a schematic flowchart of an entity establishment processing method according to an embodiment of this application. The method procedure shown in FIG. 5 may be applied to the network shown in FIG. 1(a) or FIG. 1(b). In the method procedure shown in FIG. 5, a terminal side device may separately establish a connection to a first network side device, or may establish connections to the first network side device and a second network side device in a dual connectivity manner. When the terminal side device establishes the connections to the first network side device and the second network side device in the dual connectivity manner, the first network side device may be a master network side device, or may be a secondary network side device. This is not limited in this embodiment of this application. Before step 501 in FIG. 5, the terminal side device has established a first bearer to the first network side device, and the first bearer corresponds to a first PDCP entity of the terminal side device.

Refer to FIG. 5. The method includes the following steps.

Step 501: The terminal side device determines to set a parameter of the first PDCP entity to an initial value.

The parameter of the first PDCP includes at least one of a first parameter, a second parameter, and a third parameter. The first parameter is used to indicate a serial number or a count value of a next PDCP SDU that the first PDCP entity expects to receive. The second parameter is used to indicate a serial number or a count value of a next PDCP SDU to be sent by the first PDCP entity. The third parameter is used to indicate a serial number or a count value of the $1^{st}$ PDCP SDU that is not delivered by the first PDCP entity to an upper layer.

In this embodiment of this application, the terminal side device may determine, in a plurality of manners, whether to set the parameter of the first PDCP entity to the initial value. In a first possible implementation, when determining that the first bearer corresponding to the first PDCP entity is not a radio bearer used to perform duplication transmission between the terminal side device and the core network side device, the terminal side device may determine to set the parameter of the first PDCP entity to the initial value. For details about how the terminal side device determines whether the first bearer is the radio bearer used to perform duplication transmission between the terminal side device and the core network side device, refer to the foregoing descriptions. Details are not described herein again.

In a second possible implementation, the terminal side device may further receive second indication information from the first network side device, and the second indication information is used to indicate to set the parameter of the first PDCP entity to the initial value. When receiving the second indication information, the terminal side device may determine to set the parameter of the first PDCP entity to the initial value based on the second indication information in a process of reestablishing the first PDCP entity. In this case, the first bearer corresponding to the first PDCP entity may be the radio bearer used to perform duplication transmission between the terminal side device and the core network side device, or may not be the radio bearer used to perform duplication transmission between the terminal side device and the core network side device. The second indication information may be further used to indicate a bearer identifier or a logical channel identifier corresponding to the first bearer, and the second indication information is used to indicate to set the parameter of the first PDCP entity corresponding to the bearer identifier or the logical channel identifier to the initial value. It should be noted that the second indication information may be carried in a message sent by the first network side device, or may be an independent message. This is not limited in this embodiment of this application.

It may be understood that the terminal side device may determine, based on whether the second indication information exists, whether to set the parameter of the first PDCP entity to the initial value. For example, when the terminal side device does not receive the second indication information, the terminal side device sets the parameter of the first PDCP entity to the initial value. When receiving the second indication information, the terminal side device does not set the parameter of the first PDCP entity to the initial value. The terminal side device may determine, based on a value in the second indication information, whether to set the parameter of the first PDCP entity to the initial value. For example, the value in the second indication information is true, and the parameter of the first PDCP entity is not set to the initial value. The value in the second indication information is false, and the parameter of the first PDCP entity is set to the initial value.

Step 502: The terminal side device sets the parameter of the first PDCP entity to the initial value in the process of reestablishing the first PDCP entity.

It should be noted that an initial value of the first parameter, an initial value of the second parameter, and an initial value of the third parameter are all 0.

For other content of step 501 and step 502, refer to the descriptions in step 401 and step 402. Details are not described herein again.

According to a procedure in a conventional technology, when the terminal side device reestablishes a PDCP entity, the network side device also reestablishes a PDCP entity. In a possible scenario, when the terminal side device establishes connections to the first network side device and the second network side device, if only one of the first network side device or the second network side device reestablishes a PDCP entity, status variables TX_NEXT and RX_NEXT maintained in the network side device that reestablishes the PDCP entity are set to 0, but a PDCP SN of a PDCP SDU sent by the terminal side device may not be 0. In this case, the network side device that reestablishes the PDCP entity starts a reordering timer, and can deliver the received PDCP SDU to the upper layer of a PDCP layer only after the reordering timer expires, increasing an additional delay.

Further, in another possible scenario, when the terminal side device establishes a connection to only the second network side device, if the terminal side device establishes a connection to the first network side device, status variables TX_NEXT and RX_NEXT of a newly established PDCP entity of the first network side device are 0. Because the terminal side device sends a same PDCP SDU to the first network side device and the second network side device, a PDCP SDU serial number of the PDCP SDU sent by the terminal side device does not start from 0. In this case, after receiving the PDCP SDU sent by the terminal side device, the first network side device determines that the serial number of the PDCP SDU is not 0, starts a reordering timer, and can deliver the received PDCP SDU to the upper layer of a PDCP layer only after the reordering timer expires, increasing an additional delay.

Figure 6:
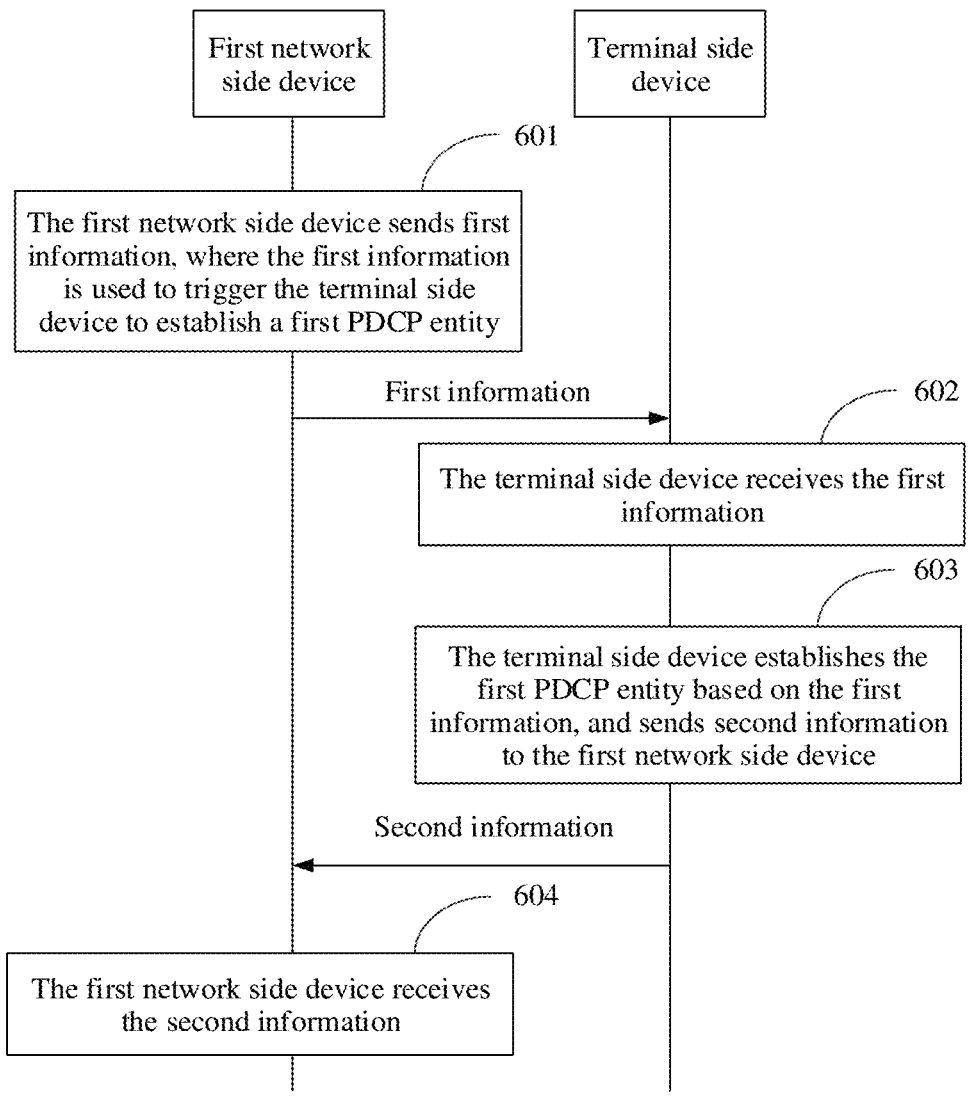
FIG. 6 is a schematic flowchart of an entity establishment processing method according to an embodiment of this application.

Therefore, in an embodiment of this application, a method is further provided to resolve the foregoing problem. FIG. 6 is a schematic flowchart of an entity establishment processing method according to an embodiment of this application. The method procedure shown in FIG. 6 may be applied to the network shown in FIG. 1. Refer to FIG. 6. The method includes the following steps.

Step 601: A first network side device sends first information, where the first information is used to trigger a terminal side device to establish a first PDCP entity.

That the first information is used to trigger the terminal side device to establish the first PDCP entity may mean that the terminal side device is triggered to reestablish the first PDCP entity, or may mean that the terminal side device is triggered to newly establish the first PDCP entity. In a possible scenario, before step 601, the terminal side device currently establishes a connection to only a second network side device. In this scenario, the first information is used to trigger the terminal side device to newly establish the first PDCP entity. After establishing a connection to the first network side device, the terminal side device may continue to maintain the connection to the second network side device, to implement dual connectivity to the first network side device and the second network side device. In this case, the terminal side device newly establishes the first PDCP entity based on the first information. In a possible scenario, before step 601, the terminal side device may establish a connection to only a second network side device, and the first PDCP entity already exists. In this scenario, the first information is used to trigger the terminal side device to reestablish the first PDCP entity, and the first PDCP entity is used for both a radio bearer established to the first network side device and a radio bearer established to the second network side device. Certainly, the terminal side device may alternatively be disconnected from the second network side device. In this case, it is equivalent to that the terminal side device is handed over from the second network side device to the first network side device. For example, after sending a reconfiguration completion message (handover completion), the terminal side device stops transmission on the bearer established to the second network side device.

In another possible scenario, before step 601, the terminal side device may alternatively have established connections to the first network side device and the second network side device in a dual connectivity manner. In this case, the first PDCP entity already exists, and the terminal side device reestablishes the first PDCP entity based on the first information.

It should be noted that when the terminal side device establishes the connections to the first network side device and the second network side device in the dual connectivity manner, the first network side device may be a master network side device, or may be a secondary network side device. This is not limited in this embodiment of this application.

A name and an implementation of the first information is not limited in this embodiment of this application. The first information may be carried in a message sent by the first network side device, or the first information may be a message sent by the first network side device. For example, the first information may be an RRC reconfiguration message. Examples are not described one by one herein.

In this embodiment of this application, in a possible implementation, the first information may be used to directly indicate the terminal side device to establish the first PDCP entity. In another possible implementation, the first information may not be used to directly indicate the terminal side device to establish the first PDCP entity, but may be used to indirectly indicate the terminal side device to establish the first PDCP entity. For example, in a first possible scenario, the first information may be used to notify the terminal side device to change or add a ciphering key used by the first PDCP entity. When determining, based on the first information, to change or add the ciphering key, the terminal side device determines to establish the first PDCP entity. In this case, the first PDCP entity already exists, and "establishing the first PDCP entity" may be understood as "reestablishing the first PDCP entity". In a second possible scenario, the first information may be used to notify the terminal side device to perform reconfiguration related to a full configuration. In this case, when determining, based on the first information, to perform reconfiguration related to the full configuration, the terminal side device determines to establish the first PDCP entity. In this case, the first PDCP entity already exists, and "establishing the first PDCP entity" may be understood as "reestablishing the first PDCP entity". In a third possible scenario, the first information may be used to notify the terminal side device to add one first PDCP entity, so that the terminal side device can receive and send data by using a bearer corresponding to the first PDCP entity through a core network side device. In this case, the terminal side device may determine, based on the first information, to establish the first PDCP entity. In this case, the first PDCP entity previously does not exist, and "establishing the first PDCP entity" may be understood as "newly establishing the first PDCP entity". The core network side device may be a UPF device.

Step 602: The terminal side device receives the first information.

Before step 602, if the terminal side device establishes the connection to the second network side device, in a possible implementation, the first information is sent by the first network side device. In other words, the first information received by the terminal side device is from the first network side device. In another possible implementation, the first information is sent by the second network side device. In other words, the first information received by the terminal side device is from the second network side device. When the first information is sent by the second network side device, the first network side device may indicate the second network side device to send the first information. A specific indication manner is not limited in this embodiment of this application, and details are not described herein.

It may be understood that the first information may be used to indicate the terminal side device to send second information. Further, the first information may further include the second information that is used to indicate the terminal side device to report a specific bearer or a specific logical channel, a protocol data unit session identifier, and a quality of service flow identifier.

Step 603: The terminal side device establishes the first PDCP entity based on the first information, and sends the second information to the first network side device.

The second information is used to indicate a serial number or a count value of a next PDCP SDU to be sent by the first PDCP entity. In another description manner, the second information may be used to indicate a serial number or a count value of a next PDCP SDU that a PDCP entity in the first network side device expects to receive on the bearer on which the first PDCP entity is located. After receiving the second information, the first network side device determines, based on the second information, a serial number or a count value of a next PDCP SDU expected to be received on an uplink. For example, the serial number or the count value of the next PDCP SDU expected to be received is set by using a value in the second information. The second information may be carried in a message sent by the terminal side device, or may be an independent message. Further, in a possible implementation, the second information may be used to further indicate a specific radio bearer or a specific logical channel for which the second information is used, that is, indicate a radio bearer or a logical channel corresponding to the first PDCP entity.

As described above, before step 601, the terminal side device has established the connection to the second network side device, the terminal side device further includes a second PDCP entity, and the second PDCP entity corresponds to a second bearer. A first bearer corresponding to the first PDCP entity and the second bearer corresponding to the second PDCP entity are a pair of bearers used to perform duplication transmission. As shown in FIG. 1(*a*) to FIG. 3, the terminal side device may transmit a PDCP SDU by using a PDCP layer packet replication technology, and the terminal side device establishes two radio bearers. The two radio bearers transmit a same PDCP SDU, and the two radio bearers may be referred to as radio bearers used to perform duplication transmission between the terminal side device and the core network side device. For example, the DRB 1 and the DRB 2 in FIG. 2 are radio bearers used to perform duplication transmission between the terminal side device and the core network side device. With reference to the foregoing descriptions, the terminal side device may determine, based on a first variable of the second PDCP entity, the serial number or the count value of the next PDCP SDU to be sent by the first PDCP entity of the terminal side device. The first variable of the second PDCP entity may be a transmitter-side variable TX_NEXT, and is used to indicate a serial number or a count value of a next PDCP SDU to be sent by the second PDCP entity. For differentiation, the transmitter-side variable is named the first variable, and details are not described again below. In this implementation, the terminal side device may use a value indicated by using the first variable as the second information, that is, use the value as the serial number or the count value of the next PDCP SDU to be sent by the first PDCP entity of the terminal side device. For example, when the terminal side device newly establishes the first PDCP entity, the serial number of the next PDCP SDU to be sent by the first PDCP entity starts from 0, but the serial number of the next PDCP SDU to be sent by the second PDCP entity of the terminal side device is 100. In this case, the terminal side device uses 100 as the second information, sends the second information to the first network side device, and takes a value from 100 for a serial number of a PDCP PDU sent by the first PDCP entity.

In this embodiment of this application, the terminal side device may further send third information to the first network side device, and the third information is used to indicate a serial number or a count value of a next PDCP SDU that the first PDCP entity expects to receive. With reference to the foregoing descriptions, the terminal side device may determine, based on a second variable of the second PDCP entity, the serial number or the count value of the next PDCP SDU that the first PDCP entity of the terminal side device expects to receive. The second variable of the second PDCP entity may be a first receiver-side variable RX_NEXT, and is used to indicate a serial number or a count value of a next PDCP SDU that the second PDCP entity expects to receive. For differentiation, the first receiver-side variable is named the second variable, and details are not described again below. For example, when the terminal side device newly establishes the first PDCP entity, the serial number of the next PDCP SDU that the first PDCP entity expects to receive is 0, but the serial number of the next PDCP SDU that the second PDCP entity of the terminal side device expects to receive is 150. In this case, the terminal side device uses 150 as the second information, sends the second information to the first network side device, and takes a value from 150 for a serial number of a PDCP PDU sent by the first PDCP entity.

It should be noted that the first information, the second information, and the third information may be sent through a same message, or may be sent through different messages in sequence. This is not limited in this embodiment of this application.

In a possible implementation, the terminal side device may notify the first network side device whether to send the second information and/or the third information. For example, the terminal side device may send fourth information to the first network side device, and the fourth information is used to indicate the terminal side device to send the second information, or the fourth information is used to indicate the terminal side device to send the second information and the third information.

It should be noted that the foregoing is merely an example. The terminal side device may further send other information, for example, fifth information and sixth information, to the first network side device. The fifth information is used to indicate a serial number or a count value of the $1^{st}$ PDCP SDU that is not delivered by the first PDCP entity to an upper layer. The sixth information is used to indicate a serial number or a count value of a PDCP PDU of the first PDCP entity, triggering a reordering timer, of the terminal side device. The fifth information may be determined based on a third variable of the second PDCP entity. The third variable is a serial number or a count value of the $1^{st}$ PDCP SDU that is not delivered by the second PDCP entity of the terminal side device to the upper layer. The sixth information may be determined based on a fourth variable of the second PDCP entity. The fourth variable is a serial number or a count value of a PDCP PDU of the second PDCP entity, triggering a reordering timer, of the terminal side device. For specific content, refer to the descriptions of the second information or the third information. Details are not described herein again.

Optionally, in a possible implementation, before sending the second information, the terminal side device may first determine whether the first bearer corresponding to the first PDCP entity is a radio bearer used to perform duplication transmission between the terminal side device and the core network side device. When the first bearer corresponding to the first PDCP entity is the radio bearer used to perform duplication transmission between the terminal side device and the core network side device, the second information is sent to the first network side device. In this embodiment of this application, the terminal side device may determine, in a plurality of manners, whether the first bearer is the radio bearer used to perform duplication transmission between the terminal side device and the core network side device. For details, refer to the descriptions in the procedure shown in FIG. 4. Details are not described herein again.

Step 604: The first network side device receives the second information.

The first network side device may receive the second information from the terminal side device. Alternatively, the first network side device may receive the second information from the second network side device, that is, the terminal side device sends the second information to the second network side device, and the second network side device forwards the second information to the first network side device.

After receiving the second information, the first network side device may set a first receiver-side variable RX_NEXT of a PDCP entity that is in the first network side device and that corresponds to the first PDCP entity to a count value indicated by using the second information. For example, if a serial number, indicated by using the second information, of a PDCP SDU is 100, the first receiver-side variable RX_NEXT of the PDCP entity that is in the first network side device and that corresponds to the first PDCP entity may be set to a count value corresponding to 100. If the count value, indicated by using the second information, of the PDCP SDU is 100, the first receiver-side variable RX_NEXT of the PDCP entity that is in the first network side device and that corresponds to the first PDCP entity may be set to 100. According to this method, the first network side device may use the serial number or the count value, indicated by using the second information, of the PDCP SDU when receiving the PDCP SDU of the terminal side device. In this way, a case in which the terminal side device sends a PDCP SDU to the first network side device based on a serial number of a PDCP SDU sent by the second PDCP entity, but the first network side device receives a PDCP SDU based on a serial number of a PDCP SDU starting from 0, and consequently, the first network side device mistakenly considers that a packet loss occurs in PDCP SDUs, and repeatedly starts the reordering timer, delaying delivery of data packets to the upper layer and increasing a transmission delay can be avoided.

Correspondingly, after receiving the third information, the first network side device may set a transmitter-side variable TX_NEXT of the PDCP entity that is in the first network side device and that corresponds to the first PDCP entity to a count value indicated by using the third information. For example, if a serial number, indicated by using the third information, of a PDCP SDU is 150, the transmitter-side variable TX_NEXT of the PDCP entity that is in the first network side device and that corresponds to the first PDCP entity may be set to a count value corresponding to 150. If the count value, indicated by using the second information, of the PDCP SDU is 150, the transmitter-side variable TX_NEXT of the PDCP entity that is in the first network side device and that corresponds to the first PDCP entity may be set to 150.

It may be understood that in a scenario in which the terminal side device sends the serial number, the first network side device receives only the serial number, and may determine the count value based on an HFN used before the first PDCP is reestablished and the serial number received from the terminal side device.

It may be understood that in the scenario in which the terminal side device sends the serial number, the first network side device receives, from the second network side device, an HFN that may be used for the first PDCP entity. The first network side device may further receive, from the second network side device, a bearer identifier, a GTP tunnel identifier, or the like associated with the HFN. When determining that the HFN is an HFN that may be used for the first PDCP, the first network side device determines the count value of the PDCP SDU based on the HFN received from the second network side device and the serial number, received from the terminal side device, of the PDCP SDU. Optionally, the first network side device requests the second network side device to send the HFN.

Figure 7:
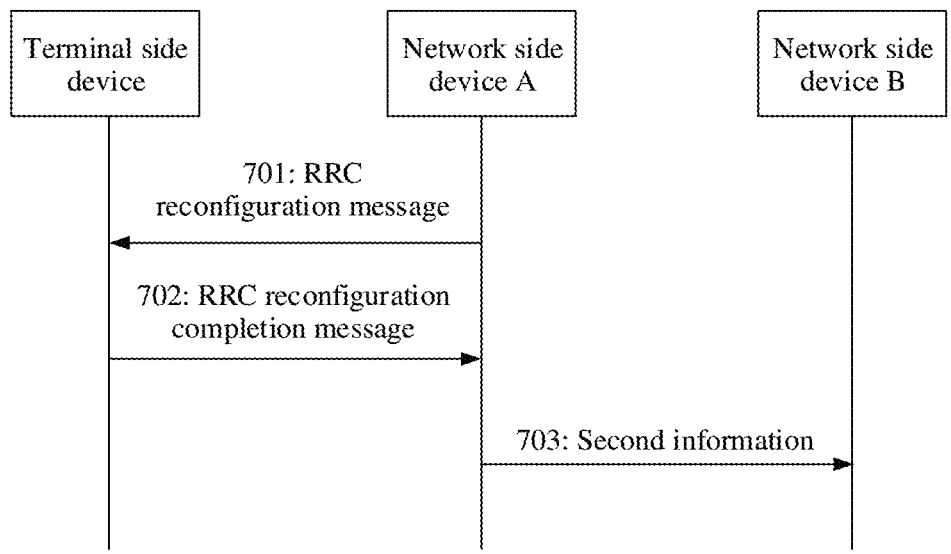
FIG. 7 is a schematic flowchart of entity reestablishment according to an embodiment of this application.

The following describes the process shown in FIG. 6 by using a specific embodiment. FIG. 7 is a schematic flowchart of PDCP entity reestablishment according to an embodiment of this application.

In the procedure shown in FIG. 7, a terminal side device establishes connections to a network side device A and a network side device B in a dual connectivity manner. The terminal side device may use the method of the terminal side device in the procedure shown in FIG. 6. The network side device A may use the method of the first network side device in the procedure shown in FIG. 6. The network side device B may use the method of the second network side device in the procedure shown in FIG. 6. The terminal side device includes a PDCP entity 1 and a PDCP entity 2, the PDCP entity 1 corresponds to a radio bearer 1, the PDCP entity 2 corresponds to a radio bearer 2, and the radio bearer 1 and the radio bearer 2 are a pair of bearers used to perform duplication transmission. To be specific, content of PDCP SDUs transmitted on the radio bearer 1 and the radio bearer 2 is the same. When receiving the PDCP SDUs transmitted on the radio bearer 1 and the radio bearer 2, a UPF device may perform deduplication processing based on serial numbers of the PDCP SDUs.

Step 701: The network side device A sends an RRC reconfiguration message to the terminal side device.

The RRC reconfiguration message may be the first information in the procedure shown in FIG. 6, or may include the first information in the procedure shown in FIG. 6. The RRC reconfiguration message may be used to notify the terminal side device to change or add a ciphering key used by the PDCP entity 1, or may be used to notify the terminal side device to perform reconfiguration related to a full configuration, or may be used to notify the terminal device to hand over to a cell in a handover process, or may be used to newly establish a bearer used to perform repeated data transmission between the terminal side device and the UPF device. The PDCP entity 1 is equivalent to the first PDCP entity in the procedure shown in FIG. 6.

Step 702: The terminal side device sends an RRC reconfiguration completion message to the network side device A.

The RRC reconfiguration completion message may be the second information in the procedure shown in FIG. 6, or may include the second information in the procedure shown in FIG. 6.

When receiving the RRC reconfiguration message, the terminal side device may determine to reestablish the PDCP entity 1 in addition to changing or adding the ciphering key used by the PDCP entity 1 or performing reconfiguration related to the full configuration, newly establishing the bearer, or handing over to the target cell.

When the PDCP entity 1 is reestablished, a PDCP entity 3 that is in the network side device A and that corresponds to the PDCP entity 1 is also reestablished. Because the content of the PDCP SDUs transmitted on the radio bearer 1 and the radio bearer 2 is the same, the serial numbers of the PDCP SDUs transmitted on the radio bearer 1 and the radio bearer 2 are the same. After the PDCP entity 3 in the network side device A is reestablished, a transmitter-side variable TX_NEXT, a first receiver-side variable RX_NEXT, a second receiver-side variable RX_DELIV, a third receiver-side variable RX_REORD, and the like of the PDCP entity 3 are all set to 0. However, a PDCP entity 4 that is in the network side device B and that corresponds to the PDCP entity 2 is not reestablished, and a serial number of a PDCP SDU sent by the PDCP entity 2 in the terminal side device to the network side device B is not 0. Therefore, the terminal side device uses a serial number or a count value of a next PDCP SDU to be sent by the PDCP entity 2 as second information and sends the second information to the network side device A. The network side device A may determine, based on the second information, a serial number or a count value of a next PDCP SDU that the PDCP entity 3 expects to receive, and therefore does not receive a PDCP SDU based on a serial number of a PDCP SDU starting from 0, thereby avoiding delaying delivery of data packets to an upper layer due to repeated start of a reordering timer, and reducing a transmission delay.

The terminal side device may further send the third information, the fourth information, the fifth information, the sixth information, and the like to the network side device A. Details are not described herein.

It may be understood that the second information, the third information, and the fourth information are optionally sent to the network side device A.

Optionally, step 703: The network side device A sends the second information to the network side device B.

It is assumed that the second information, the third information, and the fourth information are not sent to the network side device A.

It may be understood that the network side device A may use, by default, a count value used before the first PDCP is reestablished.

It may be understood that the network side device B receives, from the network side device A, at least one of an HFN, a serial number, and a count value that may be used for the first PDCP entity. The network side device B may further receive, from the network side device A, a bearer identifier, a GTP tunnel identifier, or the like associated with the HFN, the serial number, or the count value. The network side device B determines that the HFN is an HFN that may be used for the first PDCP. The network side device B determines that the serial number is a serial number that may be used for the first PDCP. The network side device B determines that the count value is a count value that may be used for the first PDCP. A part that is not received by the network side device B from the network side device A may be 0 by default. Optionally, the network side device B may alternatively request the network side device A to send the HFN, the serial number, or the count value.

In the foregoing embodiments provided in this application, the solutions of the communications method provided in the embodiments of this application are separately described from a perspective of the network elements and from a perspective of interaction between the network elements. It may be understood that, to implement the foregoing functions, the network elements and the devices, for example, the radio access network device, the access and mobility management function network element, the user equipment, the data management function network element, and the network slice selection function network element, include corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
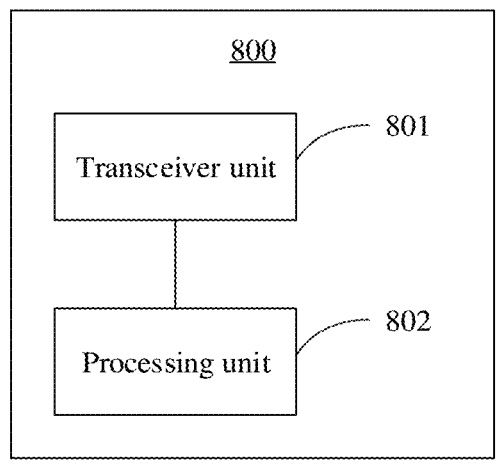
FIG. 8 is a schematic structural diagram of a communications apparatus according to an embodiment of this application.

When the foregoing network element implements the corresponding functions by using the software modules, reference may be made to FIG. 8. FIG. 8 is a schematic structural diagram of a communications apparatus according to an embodiment of this application. The communications apparatus may be configured to perform actions of the terminal side device or the first network side device in the foregoing method embodiments. The communications apparatus 800 includes a transceiver unit 801 and a processing unit 802.

When the communications apparatus 800 performs actions of the terminal side device in the procedure shown in FIG. 4, the transceiver unit 801 and the processing unit 802 respectively perform the following steps:

The transceiver unit 801 is configured to receive first indication information from a first network side device, where the first indication information is used to trigger reestablishment of a first PDCP entity of the terminal side device.

The processing unit 802 is configured to: when a first bearer corresponding to the first PDCP entity is not a radio bearer used to perform duplication transmission between the terminal side device and a core network side device, in a process in which the terminal side device reestablishes the first PDCP entity, set a parameter of the first PDCP entity to an initial value, where the parameter of the first PDCP includes at least one of a first parameter, a second parameter, and a third parameter, the first parameter is used to indicate a serial number or a count value of a next PDCP service data unit SDU that the first PDCP entity expects to receive, the second parameter is used to indicate a serial number or a count value of a next PDCP SDU to be sent by the first PDCP entity, and the third parameter is used to indicate a serial number or a count value of the $1^{st}$ PDCP SDU that is not delivered by the first PDCP entity to an upper layer.

In a possible design, when the first bearer corresponding to the first PDCP entity is the radio bearer used to perform duplication transmission between the terminal side device and the core network side device, in the process in which the terminal side device reestablishes the first PDCP entity, the parameter of the first PDCP entity is kept unchanged.

In a possible design, the transceiver unit 801 is further configured to receive second indication information from the first network side device, where the second indication information is used to indicate to set the parameter of the first PDCP entity to the initial value.

In a possible design, the transceiver unit 801 is further configured to receive third indication information from the first network side device, where the third indication information is used to indicate that the first bearer is not the radio bearer used to perform duplication transmission between the terminal side device and the core network side device.

In a possible design, the first bearer is an unacknowledged mode UM bearer.

When the communications apparatus 800 performs actions of the terminal side device in the procedure shown in FIG. 6, the transceiver unit 801 and the processing unit 802 respectively perform the following steps:

The transceiver unit 801 is configured to receive first information, where the first information is used to trigger establishment of a first packet data convergence protocol PDCP entity.

The processing unit 802 is configured to: establish the first PDCP entity, and send second information to a first network side device, where the second information is used to indicate a serial number or a count value of a next PDCP service data unit SDU to be sent by the first PDCP entity.

In a possible design, a first bearer corresponding to the first PDCP entity is a radio bearer used to perform duplication transmission between the terminal side device and a core network side device.

In a possible design, the transceiver unit 801 is further configured to send third information to the first network side device, where the third information is used to indicate a serial number or a count value of a next PDCP SDU that the first PDCP entity expects to receive.

In a possible design, the transceiver unit 801 is further configured to send fourth information to the first network side device, where the fourth information is used to indicate the terminal side device to send the second information.

In a possible design, the terminal side device further includes a second PDCP entity, and the first bearer corresponding to the first PDCP entity and a second bearer corresponding to the second PDCP entity are a pair of bearers used to perform duplication transmission; and the processing unit 802 is further configured to determine, based on a first variable of the second PDCP entity, the serial number or the count value of the next PDCP service data unit SDU to be sent by the first PDCP entity of the terminal side device, where the first variable of the second PDCP entity is used to indicate a serial number or a count value of a next PDCP SDU to be sent by the second PDCP entity.

In a possible design, the processing unit 802 is further configured to determine, based on a second variable of the second PDCP entity, the serial number or the count value of the next PDCP SDU that the first PDCP entity expects to receive, where the second variable of the second PDCP entity is used to indicate a serial number or a count value of a next PDCP SDU that the second PDCP entity expects to receive.

In a possible design, the terminal side device is connected to the first network side device and a second network side device in a dual connectivity manner, and the transceiver unit 801 is specifically configured to receive the first information from the first network side device; or receive, by the terminal side device, the first information from the second network side device.

When the communications apparatus 800 performs actions of the first network side device in the procedure shown in FIG. 6, the transceiver unit 801 and the processing unit 802 respectively perform the following steps:

The transceiver unit 801 is configured to: send first information, where the first information is used to trigger a terminal side device to establish a first packet data convergence protocol PDCP entity; and receive second information, where the second information is used to indicate a serial number or a count value of a next PDCP service data unit SDU to be sent by the first PDCP entity.

In a possible design, the transceiver unit 801 is further configured to receive third information, where the third information is used to indicate a serial number or a count value of a next PDCP SDU that the first PDCP entity expects to receive.

In a possible design, the processing unit 802 is configured to determine, based on the third information, a serial number or a count value of a next PDCP SDU to be sent by a PDCP entity corresponding to the first PDCP entity to the terminal side device.

Figure 9:
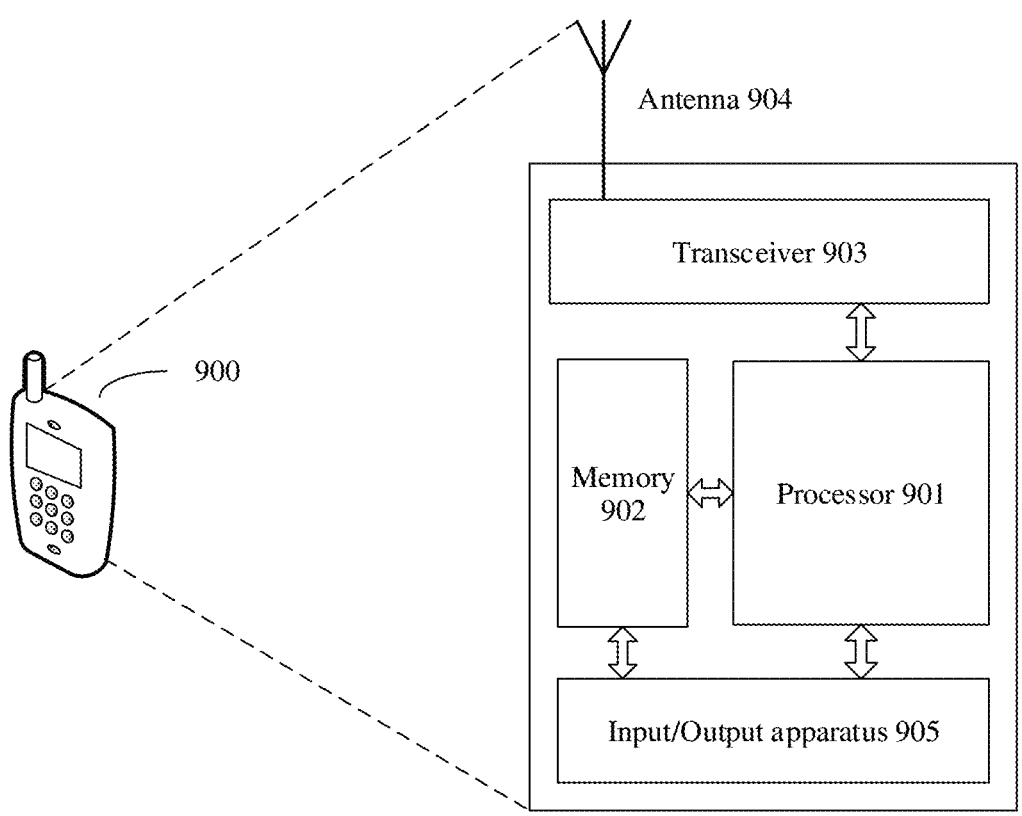
FIG. 9 is a schematic structural diagram of a terminal side device according to an embodiment of this application.

FIG. 9 is a schematic structural diagram of a terminal side device according to an embodiment of this application. The communications apparatus shown in FIG. 9 may be an implementation of a hardware circuit of the communications apparatus shown in FIG. 8. The terminal side device is applicable to a function of implementing the terminal side device in the foregoing methods. For ease of description, FIG. 9 shows only main components of the terminal side device 900. The terminal side device 900 includes a processor 901, a memory 902, a transceiver 903, an antenna 904, and an input/output apparatus 905. The memory 902 is configured to be coupled to the processor 901, and the memory 902 stores a computer program that is necessary for the terminal side device 900. The processor 901 is mainly configured to: process a communications protocol and communications data, control an entire wireless communications apparatus, execute a software program, and process data of the software program. For example, the processor 901 is configured to support the wireless communications apparatus in performing the actions described in the foregoing method embodiments. The transceiver 903 is mainly configured to: perform conversion between a baseband signal and a radio frequency signal, and process the radio frequency signal. The antenna 904 is mainly configured to send and receive a radio frequency signal in a form of an electromagnetic wave. The input/output apparatus 905, for example, a touchscreen, a display, or a keyboard, is mainly configured to receive data entered by a user and output data to the user.

When performing actions of the terminal side device in the procedure shown in FIG. 4, the terminal side device 900 performs the following steps:

The transceiver 903 is configured to receive first indication information from a first network side device, where the first indication information is used to trigger reestablishment of a first PDCP entity of the terminal side device.

The processor 901 is configured to: when a first bearer corresponding to the first PDCP entity is not a radio bearer used to perform duplication transmission between the terminal side device and a core network side device, in a process in which the terminal side device reestablishes the first PDCP entity, set a parameter of the first PDCP entity to an initial value, where the parameter of the first PDCP includes at least one of a first parameter, a second parameter, and a third parameter, the first parameter is used to indicate a serial number or a count value of a next PDCP service data unit SDU that the first PDCP entity expects to receive, the second parameter is used to indicate a serial number or a count value of a next PDCP SDU to be sent by the first PDCP entity, and the third parameter is used to indicate a serial number or a count value of the $1^{st}$ PDCP SDU that is not delivered by the first PDCP entity to an upper layer.

In a possible design, when the first bearer corresponding to the first PDCP entity is the radio bearer used to perform duplication transmission between the terminal side device and the core network side device, in the process in which the terminal side device reestablishes the first PDCP entity, the parameter of the first PDCP entity is kept unchanged.

In a possible design, the transceiver 903 is further configured to receive second indication information from the first network side device, where the second indication information is used to indicate to set the parameter of the first PDCP entity to the initial value.

In a possible design, the transceiver 903 is further configured to receive third indication information from the first network side device, where the third indication information is used to indicate that the first bearer is not the radio bearer used to perform duplication transmission between the terminal side device and the core network side device.

In a possible design, the first bearer is an unacknowledged mode UM bearer.

When performing actions of the terminal side device in the procedure shown in FIG. 6, the terminal side device 900 performs the following steps:

The transceiver 903 is configured to receive first information, where the first information is used to trigger establishment of a first packet data convergence protocol PDCP entity.

The processor 901 is configured to: establish the first PDCP entity, and send second information to a first network side device, where the second information is used to indicate a serial number or a count value of a next PDCP service data unit SDU to be sent by the first PDCP entity.

In a possible design, a first bearer corresponding to the first PDCP entity is a radio bearer used to perform duplication transmission between the terminal side device and a core network side device.

In a possible design, the transceiver 903 is further configured to send third information to the first network side device, where the third information is used to indicate a serial number or a count value of a next PDCP SDU that the first PDCP entity expects to receive.

In a possible design, the transceiver 903 is further configured to send fourth information to the first network side device, where the fourth information is used to indicate the terminal side device to send the second information.

In a possible design, the terminal side device further includes a second PDCP entity, and the first bearer corresponding to the first PDCP entity and a second bearer corresponding to the second PDCP entity are a pair of bearers used to perform duplication transmission; and the processor 901 is further configured to determine, based on a first variable of the second PDCP entity, the serial number or the count value of the next PDCP service data unit SDU to be sent by the first PDCP entity of the terminal side device, where the first variable of the second PDCP entity is used to indicate a serial number or a count value of a next PDCP SDU to be sent by the second PDCP entity.

In a possible design, the processor 901 is further configured to determine, based on a second variable of the second PDCP entity, the serial number or the count value of the next PDCP SDU that the first PDCP entity expects to receive, where the second variable of the second PDCP entity is used to indicate a serial number or a count value of a next PDCP SDU that the second PDCP entity expects to receive.

In a possible design, the terminal side device is connected to the first network side device and a second network side device in a dual connectivity manner, and the transceiver 903 is specifically configured to receive the first information from the first network side device; or receive, by the terminal side device, the first information from the second network side device.

Figure 10:
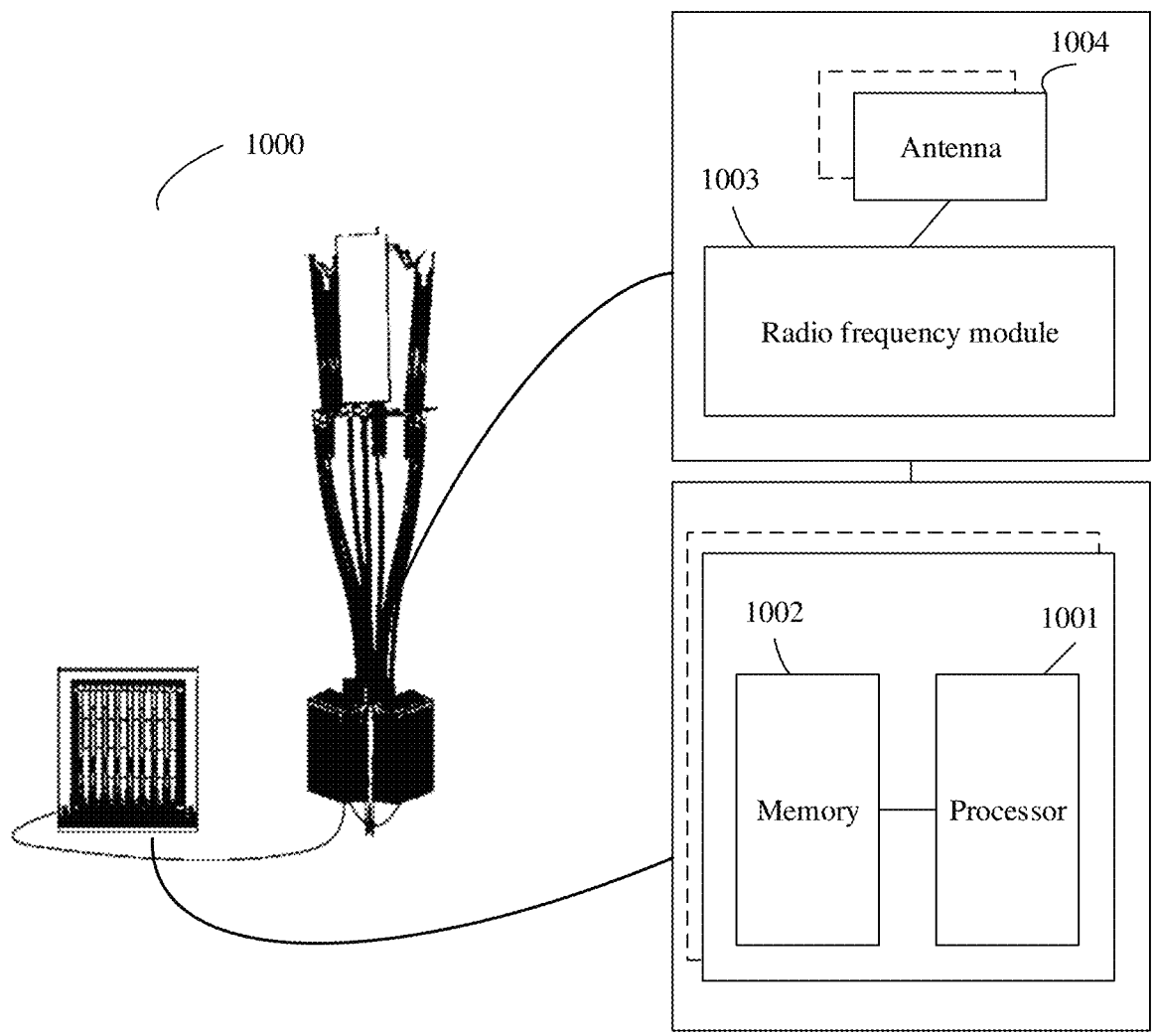
FIG. 10 is a schematic structural diagram of a network side device according to an embodiment of this application.

FIG. 10 is a schematic structural diagram of a network side device according to an embodiment of this application. The network side device shown in FIG. 10 may be an implementation of a hardware circuit of the communications apparatus shown in FIG. 8. The network side device is applicable to the flowchart shown in FIG. 6, and performs a function of the first network side device in the foregoing method embodiments. For ease of description, FIG. 10 shows only main components of the network side device. As shown in FIG. 10, the network side device 1000 includes a processor 1001, a memory 1002, a radio frequency module 1003, an antenna 1004, and the like.

The radio frequency module 1003 is configured to: send first information, where the first information is used to trigger a terminal side device to establish a first packet data convergence protocol PDCP entity; and receive second information, where the second information is used to indicate a serial number or a count value of a next PDCP service data unit SDU to be sent by the first PDCP entity.

In a possible design, the radio frequency module 1003 is further configured to receive third information, where the third information is used to indicate a serial number or a count value of a next PDCP SDU that the first PDCP entity expects to receive.

In a possible design, the processor 1001 is configured to determine, based on the third information, a serial number or a count value of a next PDCP SDU to be sent by a PDCP entity corresponding to the first PDCP entity to the terminal side device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
receiving, by a terminal-side device, first indication information from a first network-side device, wherein the first indication information triggers reestablishment of a first packet data convergence protocol (PDCP) entity of the terminal-side device;
receiving, by the terminal-side device, third indication information from the first network-side device, wherein the third indication information indicates that a first bearer corresponding to the first PDCP entity is used other than to perform duplication transmission between the terminal-side device and a core network-side device; and
when the first bearer corresponding to the first PDCP entity is used other than to perform duplication transmission between the terminal-side device and the core network-side device, in a process in which the terminal-side device reestablishes the first PDCP entity, setting a parameter of the first PDCP entity to an initial value; and
wherein the parameter of the first PDCP comprises at least one of: a first parameter, a second parameter, or a third parameter; and
wherein the first parameter indicates a serial number or a count value of a next PDCP service data unit (SDU) that the first PDCP entity expects to receive, the second parameter indicates a serial number or a count value of a next PDCP SDU to be sent by the first PDCP entity, and the third parameter indicates a serial number or a count value of a $1^{st}$ PDCP SDU that is not delivered by the first PDCP entity to an upper layer.

2. The method according to claim 1, further comprising:
receiving, by the terminal-side device, second indication information from the first network-side device, wherein the second indication information indicates to set the parameter of the first PDCP entity to the initial value.

3. The method according to claim 1, wherein the first bearer is an unacknowledged mode (UM) bearer.

4. The method according to claim 1, wherein the parameter of the first PDCP comprises the first parameter.

5. The method according to claim 1, wherein the parameter of the first PDCP comprises the second parameter.

6. The method according to claim 1, wherein the parameter of the first PDCP comprises the third parameter.

7. An apparatus, comprising:
at least one processor; and
at least one memory storing instructions, wherein the instructions are executable by the at least one processor to cause the apparatus to:
receive first indication information from a first network side device, wherein the first indication information triggers reestablishment of a first packet data convergence protocol (PDCP) entity of the apparatus;
receive third indication information from the first network side device, wherein the third indication information indicates that a first bearer corresponding to the first PDCP entity is used other than to perform duplication transmission between the apparatus and a core network-side device; and
when the first bearer corresponding to the first PDCP entity is used other than to perform duplication transmission between the apparatus and the core network-side device, in a process in which the apparatus reestablishes the first PDCP entity, set a parameter of the first PDCP entity to an initial value; and
wherein the parameter of the first PDCP comprises at least one of: a first parameter, a second parameter, or a third parameter; and
wherein the first parameter indicates a serial number or a count value of a next PDCP service data unit (SDU) that the first PDCP entity expects to receive, the second parameter indicates a serial number or a count value of a next PDCP SDU to be sent by the first PDCP entity, and the third parameter indicates a serial number or a count value of a $1^{st}$ PDCP SDU that is not delivered by the first PDCP entity to an upper layer.

8. The apparatus according to claim 7, wherein the instructions are executable by the at least one processor to further cause the apparatus to:
receive second indication information from the first network side device, wherein the second indication information indicates to set the parameter of the first PDCP entity to the initial value.

9. The apparatus according to claim 7, wherein the first bearer is an unacknowledged mode (UM) bearer.

10. The apparatus according to claim 7, wherein the parameter of the first PDCP comprises the first parameter.

11. The apparatus according to claim 7, wherein the parameter of the first PDCP comprises the third parameter.

12. A non-transitory computer readable storage medium storing a program that is executable by at least one processor, the program comprising instructions to enable a terminal-side device to:
receive first indication information from a first network-side device, wherein the first indication information triggers reestablishment of a first packet data convergence protocol (PDCP) entity of the terminal-side device;
receive third indication information from the first network-side device, wherein the third indication information indicates that a first bearer corresponding to the first PDCP entity is used other than to perform duplication transmission between the terminal-side device and a core network-side device; and
when the first bearer corresponding to the first PDCP entity is used other than to perform duplication transmission between the terminal-side device and the core network-side device, in a process in which the terminal-side device reestablishes the first PDCP entity, set a parameter of the first PDCP entity to an initial value; and
wherein the parameter of the first PDCP comprises at least one of: a first parameter, a second parameter, or a third parameter; and
wherein the first parameter indicates a serial number or a count value of a next PDCP service data unit (SDU) that the first PDCP entity expects to receive, the second parameter indicates a serial number or a count value of a next PDCP SDU to be sent by the first PDCP entity, and the third parameter indicates a serial number or a count value of a $1^{st}$ PDCP SDU that is not delivered by the first PDCP entity to an upper layer.

13. The non-transitory computer readable storage medium according to claim 12, the program further comprising instructions to enable the terminal-side device to:
receive second indication information from the first network-side device, wherein the second indication information indicates to set the parameter of the first PDCP entity to the initial value.

14. The non-transitory computer readable storage medium according to claim 12, wherein the first bearer is an unacknowledged mode (UM) bearer.

15. The non-transitory computer readable storage medium according to claim 12, wherein the parameter of the first PDCP comprises the first parameter.

16. The non-transitory computer readable storage medium according to claim 12, wherein the parameter of the first PDCP comprises the second parameter.

17. The non-transitory computer readable storage medium according to claim 12, wherein the parameter of the first PDCP comprises the third parameter.

18. The apparatus according to claim 7, wherein the parameter of the first PDCP comprises the second parameter.

* * * * *